United States Patent
Kleinsasser

(10) Patent No.: US 6,830,011 B1
(45) Date of Patent: Dec. 14, 2004

(54) REMOVAL OF A PAPER STRIP FOR REARING HATCHLINGS

(75) Inventor: Jonathan Kleinsasser, Ste. Agaathe (CA)

(73) Assignee: Crystal Sprinf Colony Farms Ltd., Manitoba (CA)

(*) Notice: Subject to any disclaimer, the term of this patent is extended or adjusted under 35 U.S.C. 154(b) by 0 days.

(21) Appl. No.: 10/768,960

(22) Filed: Feb. 2, 2004

Related U.S. Application Data

(60) Provisional application No. 60/509,066, filed on Nov. 28, 2003.

(51) Int. Cl.[7] ............................. A01K 1/015; A01K 5/00
(52) U.S. Cl. .......................... 119/449; 119/437; 119/442
(58) Field of Search ................................ 119/437, 438, 119/439, 441, 442, 449, 525, 479, 28.5

(56) References Cited

U.S. PATENT DOCUMENTS

| | | | | |
|---|---|---|---|---|
| 3,718,119 A | * | 2/1973 | Stevenson | 119/442 |
| 3,845,516 A | * | 11/1974 | Abbott et al. | 15/93.3 |
| 4,341,492 A | * | 7/1982 | Montgomery et al. | 406/130 |
| 4,768,465 A | * | 9/1988 | Church | 119/442 |
| 5,189,983 A | * | 3/1993 | Aitchison | 119/437 |
| 5,526,759 A | | 6/1996 | Cox | |
| 5,865,143 A | * | 2/1999 | Moore, Jr. | 119/442 |

* cited by examiner

Primary Examiner—Yvonne R. Abbott
(74) Attorney, Agent, or Firm—Adrian D. Battison; Michael R. Wiiliams; Ryan W. Dupuis

(57) ABSTRACT

Hatchlings are raised initially on a strip of sheet material which is laid on the floor of a containment pen with a layer of a feed material for the hatchlings. After the hatchlings have grown to a stage where they can move from the paper, the strip is removed by a hand cart operable by a user walking with the cart, the hand cart having wheels arranged for hand steering movement of the vehicle by the user to follow the strip while avoiding the hatchlings. A support is provided on the vehicle for winding the strip into a roll as the cart is moved across the floor. The support is rotated either by a motor or by a hand crank controlled by the user so that the cart is propelled solely by the winding of the strip onto the roll providing a pulling action on the cart and by pushing by the user. Alternatively the roll is driven by frictional contact with the ground wheels so that it rolls up the strip at a rate dependent on the forward movement of the cart.

11 Claims, 6 Drawing Sheets

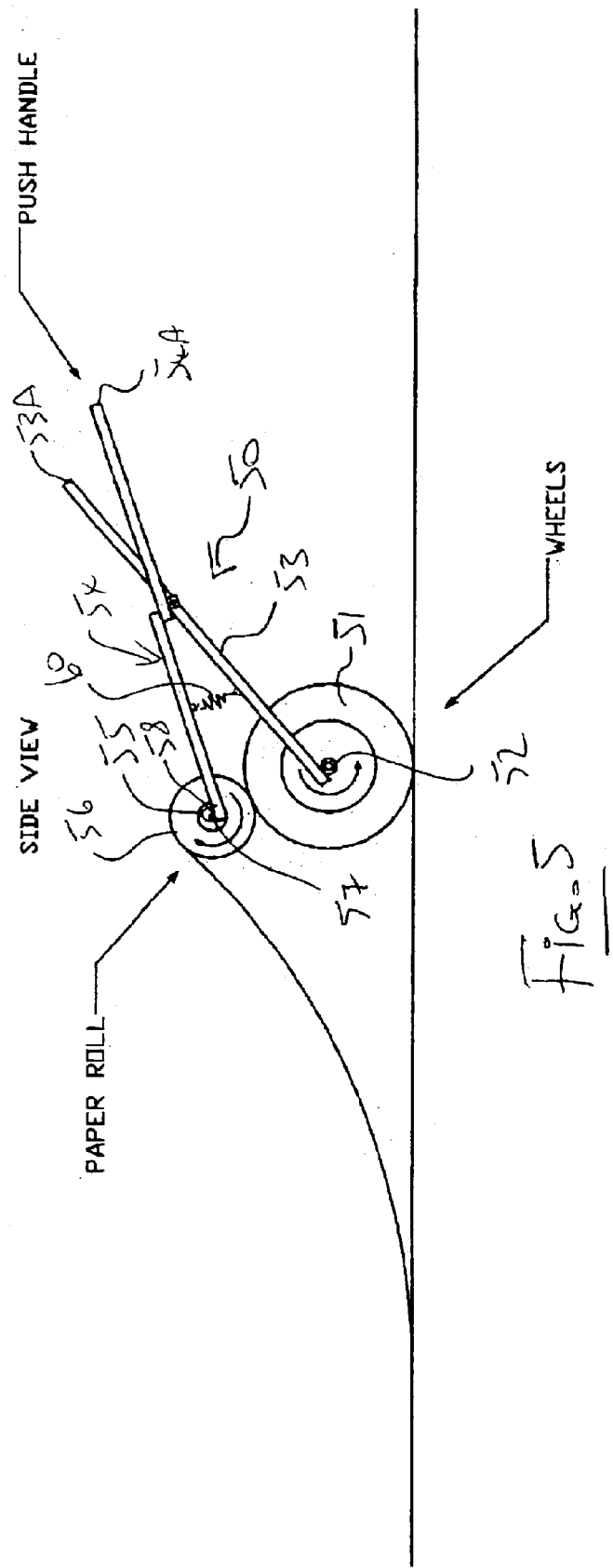

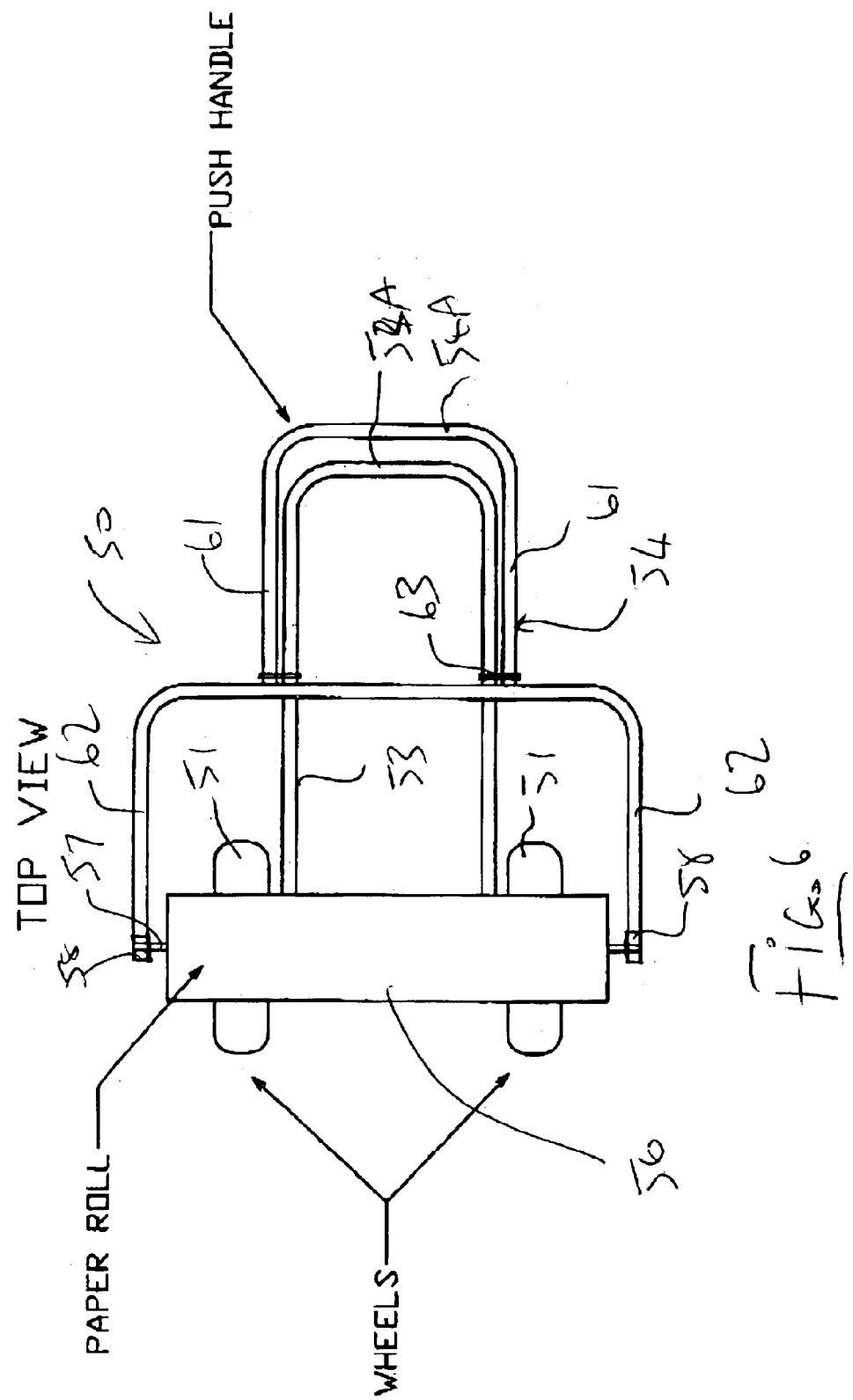

REMOVAL OF A PAPER STRIP FOR REARING HATCHLINGS

This application claims priority under 35 U.S.C. 119 from a provisional application (Ser. No. 60/509,066) filed Nov. 28, 2003.

This invention relates to an apparatus for removing strip material used for rearing hatchlings in the time period immediately after hatching. The term "hatchlings" used herein is primarily directed to chicks but is also intended to include any hatched birds such as turkeys, geese, ducks which are reared intensively.

BACKGROUND OF THE INVENTION

In U.S. Pat. No. 5,526,759 issued Jun. 18, 1996 by Cox is disclosed an apparatus for laying chick feed support paper. Such paper is used to provide a protective layer on the floor of a containment pen on which the hatchlings are placed when supplied to the pen to grow into larger birds. It is well known that placing the hatchlings or chicks on paper strip with feed immediately accessible to them reduces mortality and encourages growth.

Such paper strips have been available for some years and have replaced more traditional paper trays or other disposable materials onto which the birds can be placed with the feed material accessible to them.

Traditionally such paper strip is laid along the floor of an empty barn manually by unrolling from a roll and a strip of feed material is poured or placed on the strip before the chicks are manually carried in to the pen and deposited on the paper with the feed.

Cox provides a trailer arrangement which carries a roll of the paper strip, in which a groove is formed in the material, such as straw or wood shavings, forming the floor surface and the paper is laid into the groove by a rolling wheel which holds the strip in place as it is unrolled from a supply. This device has apparently found little commercial success and is believed not to be available on the market place.

In a co-pending application filed on Sep. 30, 2003 by Maendel under Ser. No. 10/673,553 is disclosed an arrangement for automating the laying of the paper and feed thus reducing the requirements for manual operators in the process and providing a machine which reduces the unpleasantness of the process, while at the same time providing an improved placement of the feed on the paper.

However other aspects of the process still require manual operation which is often unpleasant due to the presence of the manure from the birds and which can damage the birds which are still weak and thus prone to be trampled.

SUMMARY OF THE INVENTION

It is one object of the invention to provide a strip removal apparatus for use in the process of rearing hatchlings in the time period immediately after hatching.

According to one aspect of the invention there is provided apparatus comprising:

a vehicle having ground wheels for movement over a floor of a containment area for raising hatchlings into birds;

the ground wheels being arranged for movement of the vehicle to follow a path of a strip of sheet material laid over the floor;

a support on the vehicle for receiving a roll of the sheet material such that the sheet material can be wound into the roll from the floor as the vehicle is moved across the floor;

the support being arranged for removal of the wound roll from the support when wound for disposal;

and the support being arranged to be driven for winding the strip onto the roll.

Preferably the vehicle comprises a hand cart with guide handles for propelling of the vehicle by pushing by a user walking with the vehicle.

Preferably the vehicle comprises a hand cart with wheels allowing hand steering of the hand cart.

Preferably the vehicle is arranged to be propelled by the drive mechanism for driving rotation of the support causing a pulling action on the strip. This provides an arrangement which is inexpensive in that there is only one drive mechanism which controls both the rolling and the forwarding action thus making it easier to control. Where the movement is slowed or halted in the event of an obstacle or obstruction, the power to move the cart forwardly can be assisted by the user providing a pushing action.

In one arrangement, the drive mechanism for driving rotation of the support comprises a motor driven by a power source on the vehicle such as a battery for an electric motor. Alternatively other power sources may be used such as a clockwork type spring, which may be driven prior to use by a hand crank at a geared-up rate to wind up the spring so that unwinding of the spring drives the roller while the user walks behind the cart and can concentrate on guiding the cart and avoiding the hatchlings.

Alternatively the drive mechanism for driving rotation of the support may comprise a hand crank arranged to be driven by a user while walking alongside the vehicle, thus making an less expensive and hand operated arrangement.

Preferably the hand crank is arranged at a height to be driven by the user while standing adjacent the hand cart and wherein the support is arranged at a front of the hand cart adjacent the floor for rolling the strip from the floor and wherein there is provided a drive coupling for communicating drive from the hand crank to the support.

Whether the drive mechanism is motor powered or hand driven, advantageously it is operable by a user for controlling the rate of winding, thus allowing the rate of movement to be controlled to avoid damaging birds which are slower to move from the path of the cart.

According to a second aspect of the invention there is provided an apparatus comprising:

a hand cart operable by a user walking with the cart, the hand cart having ground wheels for movement over a floor of a containment area for raising hatchlings into birds;

the ground wheels being arranged for steering movement of the cart by the user to follow a path of a strip of sheet material laid over the floor;

a support on the cart for receiving a roll of the sheet material such that the sheet material can be wound into the roll from the floor as the vehicle is moved across the floor;

and a drive mechanism operable by the user for driving rotation of the support on the cart for winding the strip onto the roll at a rate determined by the user;

the support being arranged for removal of the wound roll from the support when wound for disposal;

the hand cart being arranged to be propelled solely by the winding of the strip onto the roll providing a pulling action on the cart and by pushing by the user.

According to a third aspect of the invention there is provided a method of raising hatchlings comprising:

laying a strip of a sheet material over the floor of a barn for containing the hatchlings;

providing a layer of feed on the strip for eating by the hatchlings;

placing the hatchlings on the strip;

and, after the hatchlings have grown sufficiently to move from the strip, providing a vehicle having ground wheels for movement over the floor;

moving the vehicle to follow a path of the strip of sheet material laid over the floor;

providing a support on the vehicle for receiving a roll of the sheet material such that the sheet material can be wound into the roll from the floor as the vehicle is moved across the floor;

driving rotation of the support on the vehicle for winding the strip onto the roll;

and removing the wound roll from the support for disposal.

In accordance with an alternative arrangement of the invention there is provided an apparatus comprising:

a vehicle having ground wheels for movement over a floor of a containment area for raising hatchlings into birds;

the ground wheels being arranged for movement of the vehicle to follow a path of a strip of sheet material laid over the floor;

the vehicle having a hand bar such that the vehicle can be propelled by a pushing force from a user walking alongside the vehicle;

a support on the vehicle for receiving a roll of the sheet material such that the sheet material can be wound into the roll from the floor as the vehicle is moved across the floor;

the support being arranged for removal of the wound roll from the support when wound for disposal;

and the support being arranged to be driven from the ground wheels as the vehicle is propelled by pushing by the user walking alongside the vehicle.

BRIEF DESCRIPTION OF THE DRAWINGS

One embodiment of the invention will now be described in conjunction with the accompanying drawings in which:

FIG. 5 is side elevational view of another embodiment of an apparatus according to the present invention for removing a paper layer for raising hatchlings.

FIG. 6 is a top plan view of the apparatus of FIG. 5.

In the drawings like characters of reference indicate corresponding parts in the different figures.

DETAILED DESCRIPTION

Figure 1:
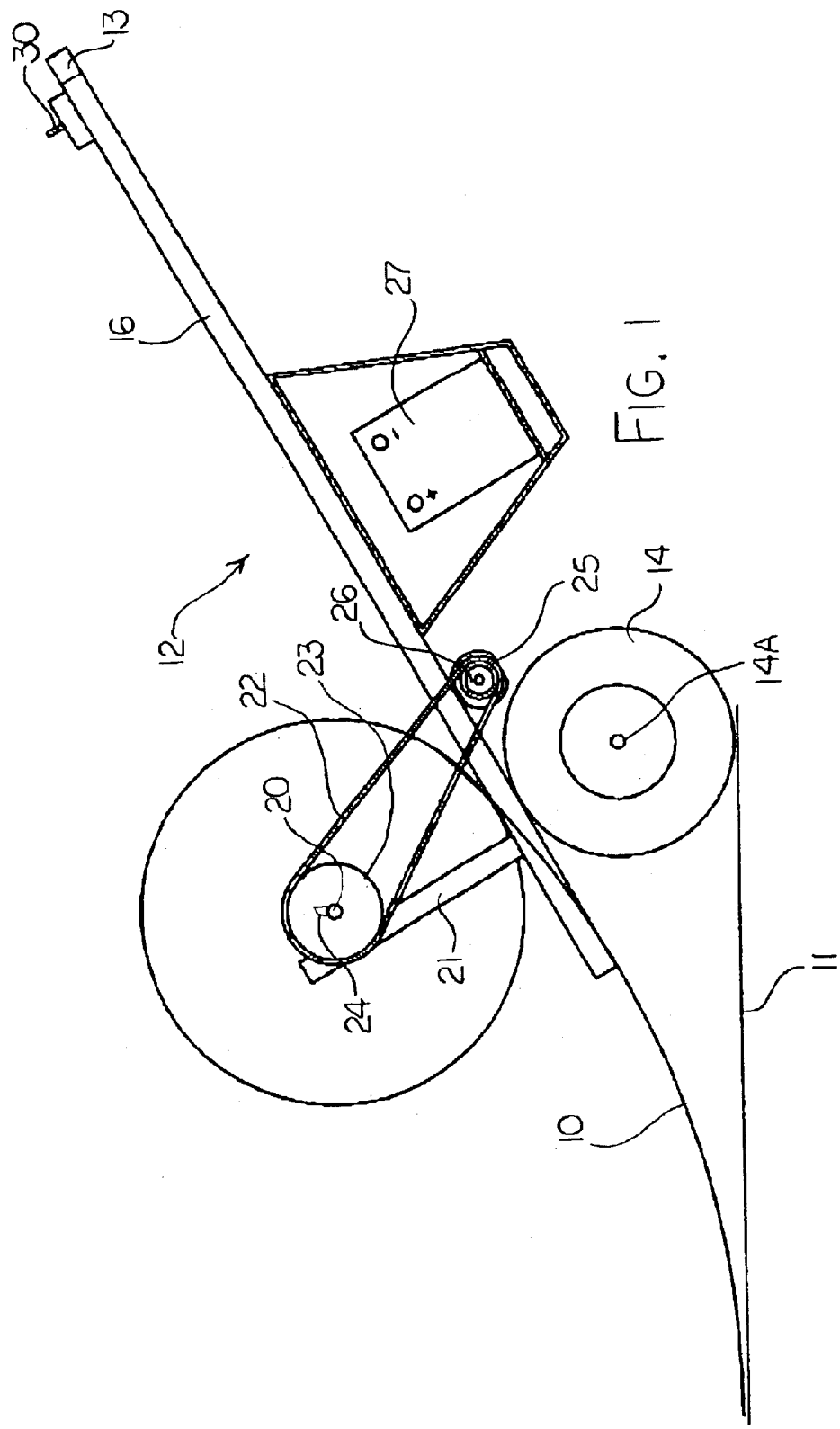
FIG. 1 is side elevational view of one embodiment of an apparatus according to the present invention for removing a paper layer for raising hatchlings.

In the Figures is shown an arrangement for rolling a strip of sheet material 10 from the floor 11 of a barn for raising hatchlings.

As disclosed in the above patent of Cox and the above application of Maendel, the disclosures of which are both incorporated herein by reference, the strip of sheet material is laid on the floor of a barn with a layer of feed so that chicks when hatched can be placed on the paper so as to be protected from the floor and so as to have immediately accessible to them feed material allowing them to take up the feed material for initial growth. It is well known that such paper and directly accessible feed significantly reduced mortality. Conventionally such paper material is rolled by the user on the floor and picked up when rolled for disposal.

The arrangement shown in the figures comprises a hand cart 12 which can be pushed the user with the user standing behind the cart at a transverse handle 13. The cart has two wheels 14 at spaced positions across the cart. In the embodiment shown there are only two wheels which thus allow ready steering of the cart by the user walking along behind the cart and guiding the cart by the handle 13. However another embodiment (not shown) may include rear castor wheels as this is preferred for stability but the number of wheels can be reduced or increased as required. In the arrangement shown the front wheels are simple fixed wheels on a transverse axle 14A so that the user can guide the cart in movement along the strip of material laid on the floor with any re-alignment with the strip necessary being obtained by slight steering movements side to side.

The frame is of a simple construction formed from simple bent tubing to form two side members 16 and 17 connected by cross members 18. The side members 16 and 17 curve upwardly at the rear of the cart to the transverse handle 13 which is at the height to be grasped by the user so that the user can walk behind the cart and guide the cart in its movement. The user can also apply pushing movements to the cart when necessary to move the cart over any obstacles such as raised parts of the floor, bearing in mind that the floor is generally relatively soft being formed from straw and any waste material collecting in the straw.

On the frame is carried a transverse axle 20 carried on a raised support arm 21 from one side of the frame. The axle is carried in bearings for rotation about a horizontal axis parallel to the axle 14A and raised above the axle 14A. The axle 20 is driven in rotation by a chain 22 co-operating with a sprocket 23 at one end of the axle. The axle is supported and driven at one end so that the other end is open. A pinch member 24 is carried on the axle and can pinch an end of the strip material onto the axle when manually inserted between the pinch member and the axle to commence a winding action on the axle.

In FIG. 1, the chain 22 is driven by a motor 25 having a sprocket 26 aligned with the sprocket 23 with a motor receiving power from a battery 27 also carried on the frame. The rate of rotation of the motor is controlled by a control lever 30 located at the transverse handles 13. The wheels are not driven so that motive power for moving the vehicle or hand cart over the floor is provided solely by pulling action on the paper and/or the pushing action by the user.

In use, the user aligns the vehicle with the paper strip on the floor of the barn, which may be as much as 100 yards in length. The adjacent end of the strip is attached to the axle 20 by way of the pinch member 24 and the actuating lever 30 is operated to drive the motor to wind in the paper strip. Where the paper strip has sufficient weight from its own mass or from any material resting upon the strip, the vehicle is pulled along the floor by the winding paper strip as guided by the user walking behind the vehicle. In the event that the vehicle becomes misaligned, the user redirects the vehicle to the required direction. In the event that any of the hatchlings are too slow to move away from the vehicle, the new vehicle can be immediately halted or redirected to avoid the hatchlings and any damage to them. Halting of the movement is of course effected by shutting off the drive motor which stops the pulling action on the paper. When the paper is sufficiently wound so that it is no longer sufficiently heavy to pull the vehicle forwardly, the paper will slide across the floor and roll up onto the axle 24 and the roll formed thereon. The axle is positioned at a height sufficiently away from the frame so as to wind up the full length of a paper strip laid over the floor. If any breakages occur, commencement or winding can be carried out by the operator holding the strip onto the roll until sufficient tension has built up to cause winding to continue and the vehicle to move forwardly.

When the full roll is wound either to complete length of the strip or the maximum diameter available on the vehicle, the roll can be pulled of the end of the axle and away from the pinch member 24 simply by lifting the axle off its support 25 and by pulling on the roll at the exposed end of the axle. Thus as shown in the drawings, the axle is carried in a simple cup at each end from which it can be lifted to release the finished wound roll. In another embodiment (not shown) the axle may be cantilevered from one side of the frame leaving the other end open and unsupported for directly pulling the roll off the axle. In the alternative, the axle may be removable to form two supports or one of the supports pivotal away from the end of the axle to allow access to the end of the axle to pull the rolled sheet material from the end of the axle for disposal.

The pinch member is preferably an elongate rod which clips to the axle at each end to lie parallel to and in contact with the axle to locate the end of the paper therebetween. However other types of clips which grasp the end of the paper with enough force merely to start the winding action may be used.

Figure 2:
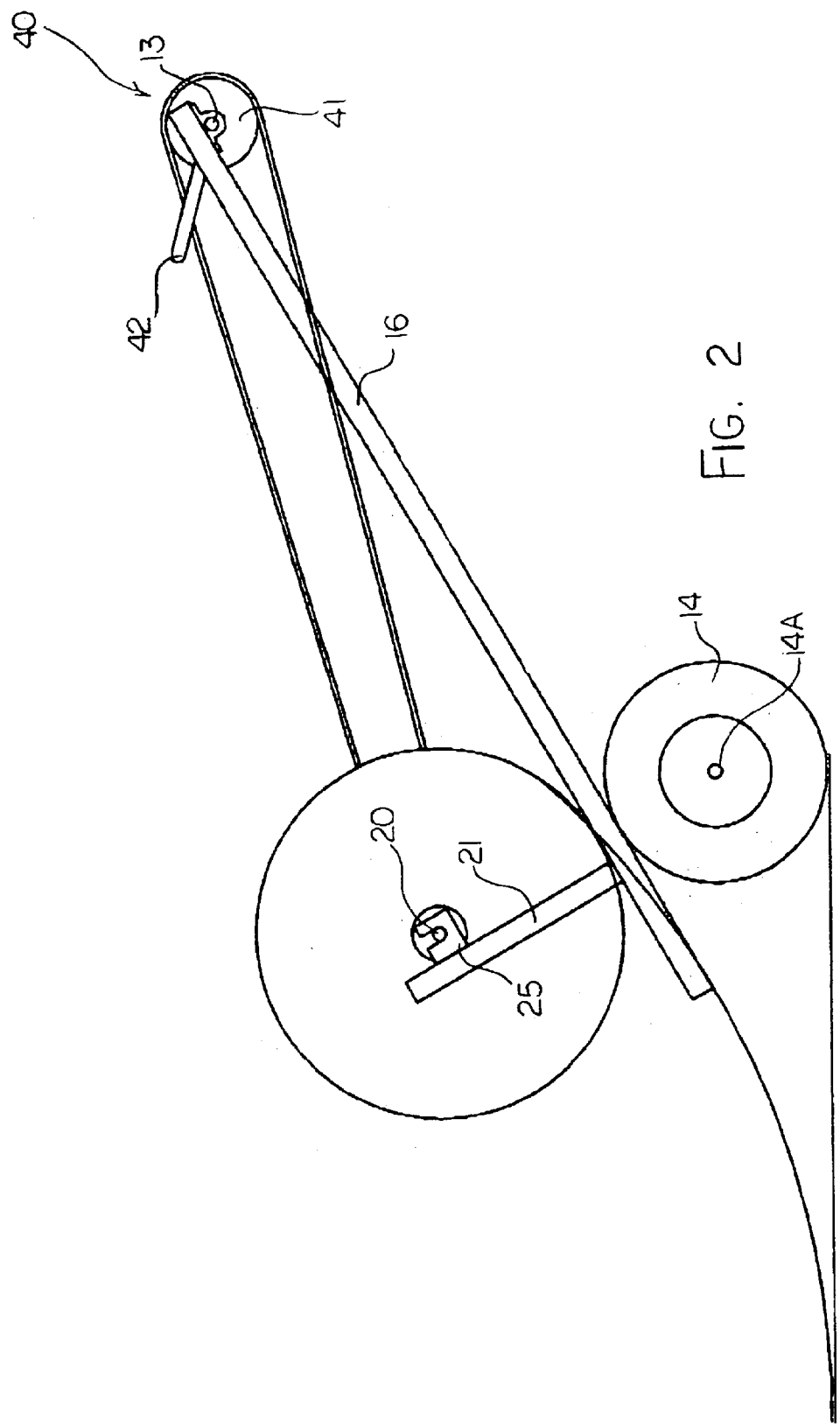
FIG. 2 is a side elevational view of a second embodiment similar to that of the apparatus of FIG. 1, but using a hand crank.
Figure 3:
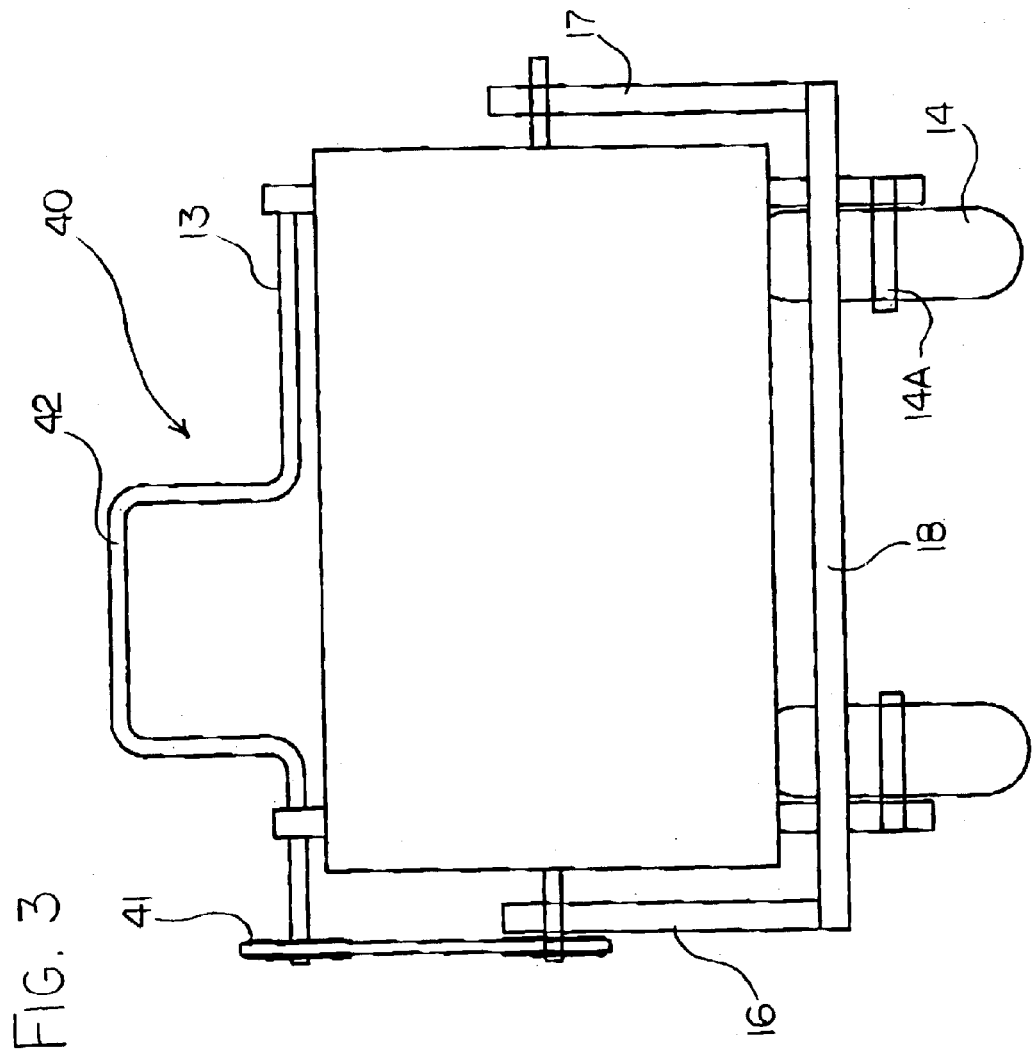
FIG. 3 is a front elevational view of the apparatus of FIG. 2.
Figure 4:
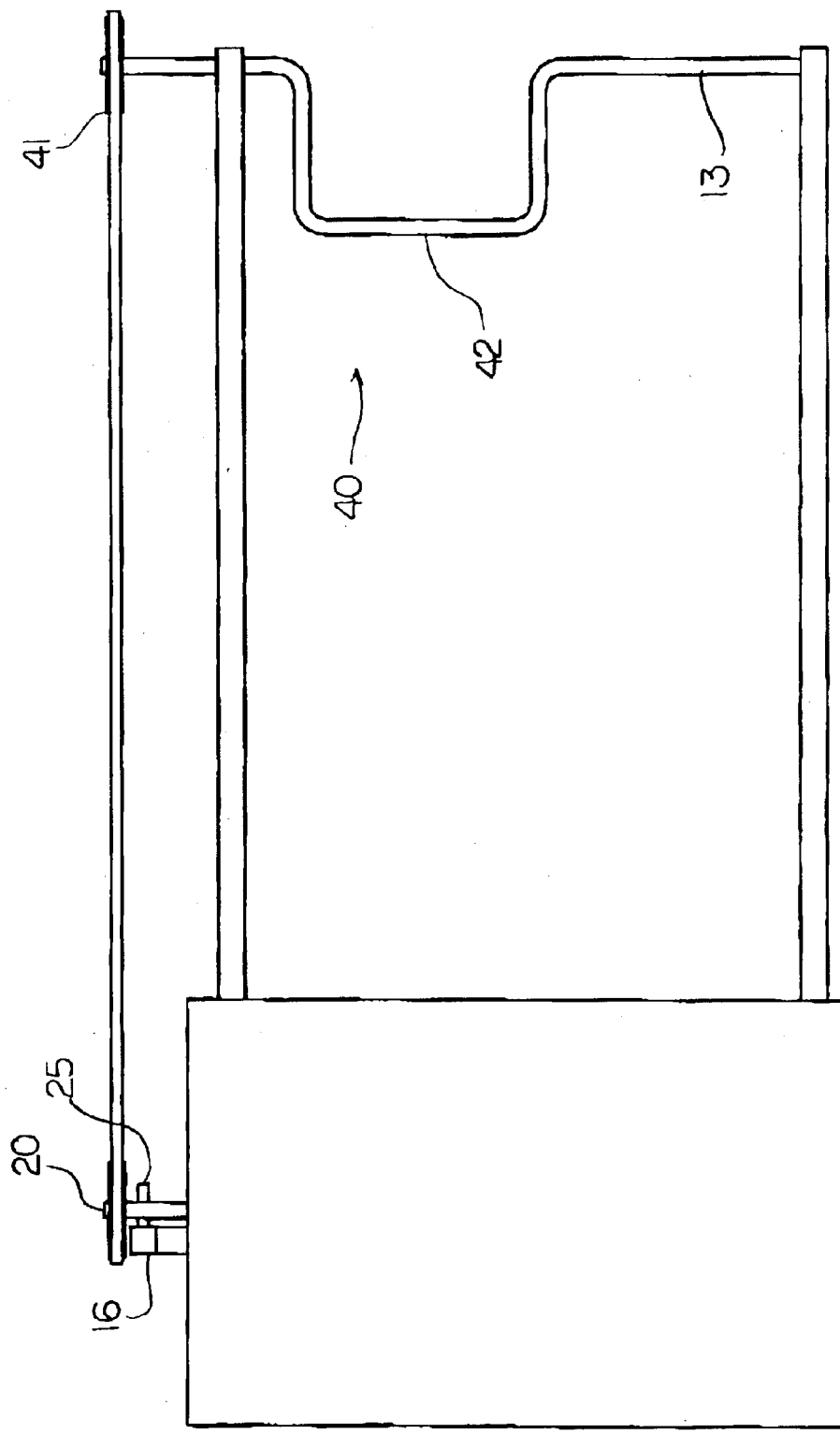
FIG. 4 is a top plan view of the apparatus of FIG. 2.

As shown in FIG. 2, the motor 25 and the battery 27 are replaced by a simple hand crank arrangement 40 located at the handle 13. The hand crank provides a sprocket 41 carried on the handle 13 with a crank 42 rotatable around the handle 13 to drive the sprocket 41 which is aligned with the sprocket 23 as previously described. The user of the hand crank reduces the cost of the structure since no motors or power supply are required. The user can operate the hand crank simply on one side of the vehicle while guiding the vehicle with the opposite hand bearing in mind that little force is required due to the light weight of the vehicle. The use of the hand crank allows immediate control of the rate or forward movement of the vehicle ensuring that it can be halted to avoid damaging any of the hatchlings.

In FIGS. 5 and 6 is shown an alternative arrangement in which the paper roll is driven by frictional contact with the ground wheels. Thus the hand cart generally indicated at 50 includes ground wheels 51 carried on an axle 52. The axle is supported on a U-shaped frame member 53 located between the wheels 51 and extending to a top bar 54 which is horizontal and spaced rearwardly and upwardly from the wheels for manual engagement by a person walking behind the cart.

Attached to the frame 53 is provided a support frame 54 which carries a support roller 55 for the paper roll 56. The support roller 55 is carried on an axle 57 mounted on attachments 58 on top of the frame 54 by which the axle 58 can be lifted off the frame allowing the support roller 55 and the paper roll 56 to be pulled off one end of the axle for disposal of the paper roll. The frame 54 includes a cross bar 54A parallel to and closely adjacent the cross bar 53A. The frame 54 is pivotally mounted on the side legs of the frame 53 so that upward and downwardly movement applied onto the cross bar 54A by the user increases or decreases the force from the paper roll on the ground wheels. In this way the frictional contact can be increased where necessary to ensure that the paper roll is frictionally driven by rotation of the ground wheels as required. In addition the roll can be moved away from the ground wheels to eliminate the driving action, if it is desired to manoeuvre the cart without causing the rolling action. In this way the user can manoeuvre the cart as required and can control the rolling action of the paper onto the roll at a speed which is proportional to the forwarding speed of the cart, except when the user needs to manoeuvre the vehicle without rolling.

A spring 60 can be provided which applies a basic tensioning force between the frames 53 and 54 to provide a basic tensioning of the roll on the ground wheels.

As the ground wheels are maintained close together for simple manoeuvrability of the vehicle, the roll is wider than the spacing between the wheels and thus extends outwardly beyond each of the wheels. This ensures contact of the paper roll on the wheels. For this reason the frame 54 is formed with narrower side legs 61 at the cross bar 54A and with wider side legs 62 at the axle 57. Thus the legs 61 are closely adjacent the side legs of the frame 53 allowing the pivotal action by way of a simple pin mounting 63. The hand bars or cross bars 53A and 54A are thus relatively narrow, easily grasped and closely adjacent one with the other allowing the operator to hold one or both as required to provide the necessary forward motion pushing the cart and the necessary force between the two frames to raise or lower the roll on the top surface of the ground wheels.

Suitable ground wheels with relatively wide surfaces can be provided to provide a significant frictional engagement with the ground to ensure that the ground wheels rotate and also significant frictional contact with the paper roll to ensure that the rotation of the ground wheels from the movement over the ground is transferred accurately to the rotation of the paper roll.

Since various modifications can be made in my invention as herein above described, and many apparently widely different embodiments of same made within the spirit and scope of the claims without department from such spirit and scope, it is intended that all matter contained in the accompanying specification shall by interpreted as illustrative only and not in a limiting sense.

What is claimed is:

1. A method of raising hatchlings comprising:
   laying a strip of a sheet material over the floor of a barn for containing the hatchlings;
   providing a layer of feed on the strip for eating by the hatchlings;
   placing the hatchlings on the strip;
   and, after the hatchlings have grown sufficiently to move from the strip, providing a vehicle having ground wheels for movement over the floor;
   moving the vehicle to follow a path of the strip of sheet material laid over the floor;
   providing a support on the vehicle for receiving a roll of the sheet material such that the sheet material can be wound into the roll from the floor as the vehicle is moved across the floor;
   driving rotation of the support on the vehicle for winding the strip onto the roll at a rate related to the rate of movement of the vehicle to wind up the strip as the vehicle moves along the strip;
   and removing the wound roll from the support for disposal.

2. The method according to claim 1 wherein the vehicle comprises a hand cart with guide handles for propelling of the vehicle by pushing by a user walking with the vehicle.

3. The method according to claim 2 wherein the vehicle comprises a hand cart with two wheels allowing hand steering of the hand cart.

4. The method according to claim 2 wherein the vehicle is arranged to be propelled by the drive mechanism for driving rotation of the support causing a pulling action on the strip.

5. The method according to claim 2 wherein the support is arranged to be driven by a motor driven by a power source on the vehicle.

6. The method according to claim 2 wherein the support is arranged to be driven by a hand crank operated by a user walking alongside the vehicle.

7. The method according to claim 6 wherein the hand crank is arranged at a height to be driven by the user while standing adjacent the hand cart and wherein the support is arranged at a front of the hand cart adjacent the floor for rolling the strip from the floor and wherein there is provided a drive coupling for communicating drive from the hand crank to the support.

8. The method according to claim 2 wherein the support is arranged to be driven manually by a user for controlling the rate of winding.

9. The method according to claim 2 wherein the support is arranged to be driven from the ground wheels as the vehicle is propelled by pushing by a user walking alongside the vehicle.

10. The method according to claim 9 wherein the support is arranged such that the roll rests on the ground wheels for frictional engagement therewith.

11. The method according to claim 10 wherein the support includes a manually operable lever adjacent the hand bar by which the user can lift the support such that it is free from being driven while the user propels the vehicle.

* * * * *